US011887608B2

(12) United States Patent
Tsingos et al.

(10) Patent No.: US 11,887,608 B2
(45) **Date of Patent: *Jan. 30, 2024**

(54) METHODS, APPARATUS AND SYSTEMS FOR ENCODING AND DECODING OF DIRECTIONAL SOUND SOURCES

(71) Applicants: DOLBY LABORATORIES LICENSING CORPORATION, San Francisco, CA (US); DOLBY INTERNATIONAL AB, Amsterdam (NL)

(72) Inventors: Nicolas R. Tsingos, San Francisco, CA (US); Mark R. P. Thomas, Walnut Creek, CA (US); Christof Fersch, Neumarkt (DE)

(73) Assignees: DOLBY LABORATORIES LICENSING CORPORATION; DOLBY INTERNATIONAL AB, Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,732

(22) Filed: Apr. 23, 2022

(65) Prior Publication Data

US 2022/0328052 A1 Oct. 13, 2022

Related U.S. Application Data

(63) Continuation of application No. 17/047,403, filed as application No. PCT/US2019/027503 on Apr. 15, 2019, now Pat. No. 11,315,578.

(Continued)

(51) Int. Cl.
*G10L 19/008* (2013.01)
*H04S 7/00* (2006.01)

(52) U.S. Cl.
CPC ............ *G10L 19/008* (2013.01); *H04S 7/302* (2013.01); *H04S 2400/11* (2013.01); *H04S 2420/01* (2013.01)

(58) Field of Classification Search
CPC .... G10L 19/008; H04S 7/302; H04S 2400/11; H04S 2420/01
See application file for complete search history.

(56) References Cited

U.S. PATENT DOCUMENTS 9,478,225 B2 10/2016 Sen
9,489,954 B2 11/2016 Hooks (Continued)

FOREIGN PATENT DOCUMENTS

JP 2017520177 A 7/2017
RU 2519295 C2 6/2014
WO 2019068638 A1 4/2019

OTHER PUBLICATIONS

Bleidt, R. et al "Object-Based Audio: Opportunities for Improved Listening Experience and Increased Listener Involvement" SMPTE Motion Imaging Journal, vol. 124, Issue 5, Oct. 26, 2015.

(Continued)

*Primary Examiner* — Fan S Tsang
*Assistant Examiner* — David Siegel

(57) ABSTRACT

Some disclosed methods involve encoding or decoding directional audio data. Some encoding methods may involve receiving a mono audio signal corresponding to an audio object and a representation of a radiation pattern corresponding to the audio object. The radiation pattern may include sound levels corresponding to plurality of sample times, a plurality of frequency bands and a plurality of directions. The methods may involve encoding the mono audio signal and encoding the source radiation pattern to determine radiation pattern metadata. Encoding the radiation pattern may involve determining a spherical harmonic transform of (Continued)

the representation of the radiation pattern and compressing the spherical harmonic transform to obtain encoded radiation pattern metadata.

11 Claims, 9 Drawing Sheets

Related U.S. Application Data

(60) Provisional application No. 62/741,419, filed on Oct. 4, 2018, provisional application No. 62/681,429, filed on Jun. 6, 2018, provisional application No. 62/658,067, filed on Apr. 16, 2018.

(56) References Cited

U.S. PATENT DOCUMENTS

| | | | | |
|---|---|---|---|---|
| 9,685,163 | B2 | 6/2017 | Sen | |
| 9,711,126 | B2 | 7/2017 | Mehra | |
| 9,712,936 | B2 | 7/2017 | Peters | |
| 9,721,575 | B2 | 8/2017 | Dressler | |
| 9,761,229 | B2 | 9/2017 | Xiang | |
| 2011/0164756 | A1 | 7/2011 | Baumgarte | |
| 2013/0010982 | A1 | 1/2013 | Elko | |
| 2014/0023196 | A1 * | 1/2014 | Xiang | H04S 7/30 381/17 |
| 2015/0264484 | A1 * | 9/2015 | Peters | G10L 19/008 381/17 |
| 2017/0195815 | A1 | 7/2017 | Christoph | |
| 2020/0221230 | A1 * | 7/2020 | Fuchs | G10L 19/008 |

OTHER PUBLICATIONS

Mehra, R. et al "Source and Listener Directivity for Interactive Wave-Based Sound Propagation" IEEE Transactions on Visualization and Computer Graphics 2014, vol. 20, Issue 4, pp. 495-503.

Weinzierl, S. et al "A Database of Anechoic Microphone Array Measurements of Musical Instruments" 2017 http://dx.doi.org/10.14279/depositonce-5861.2.

* cited by examiner

400

METHODS, APPARATUS AND SYSTEMS FOR ENCODING AND DECODING OF DIRECTIONAL SOUND SOURCES

CROSS-REFERENCE TO RELATED APPLICATIONS

This application is a continuation of U.S. patent application Ser. No. 17/047,403, filed Oct. 14, 2020, which is the national stage entry for PCT Application No. PCT/US2019/027503, filed Apr. 15, 2019, which claims the benefit of priority to U.S. Provisional Patent Application No. 62/741,419, filed Oct. 4, 2018, U.S. Provisional Patent Application No. 62/681,429, filed Jun. 6, 2018 and U.S. Provisional Patent Application No. 62/658,067, filed Apr. 16, 2018, each of which is incorporated herein by reference in its entirety.

TECHNICAL FIELD

The present disclosure relates to encoding and decoding of directional sound sources and auditory scenes based on multiple dynamic and/or moving directional sources.

BACKGROUND

Real-world sound sources, whether natural or man-made (loudspeakers, musical instruments, voice, mechanical devices), radiate sound in a non-isotropic way. Characterizing a sound source's radiation patterns (or "directivity") can be critical for a proper rendering, in particular in the context of interactive environments such as video games, and virtual/augmented reality (VR/AR) applications. In these environments, the users generally interact with directional audio objects by walking around them, thereby changing their auditory perspective on the generated sound (a.k.a. 6-degree of freedom [DoF] rendering). The user may also grab and dynamically rotate the virtual objects, again requiring the rendering of different directions in the radiation pattern of the corresponding sound source(s). In addition to a more realistic rendering of the direct propagation effects from a source to a listener, the radiation characteristics will also play a major role in the higher-order acoustical coupling between a source and its environment (e.g., the virtual environment in a game), therefore affecting the reverberated sound (i.e., sound waves traveling back and forth, as in an echo). As a result, such reverberation may impact other spatial cues such as perceived distance.

Most audio game engines offer some way of representing and rendering directional sound sources but are generally limited to a simple directional gain relying on the definition of simple 1st order cosine functions or "sound cones" (e.g., power cosine functions) and simple hi-frequency roll-off filters. These representations are insufficient to represent real-world radiation patterns and are also not well suited to the simplified/combined representation of a multitude of directional sound sources.

SUMMARY

Various audio processing methods are disclosed herein. Some such methods may involve encoding directional audio data. For example, some methods may involve receiving a mono audio signal corresponding to an audio object and a representation of a radiation pattern corresponding to the audio object. The radiation pattern may, for example, include sound levels corresponding to plurality of sample times, a plurality of frequency bands and a plurality of directions. Some such methods may involve encoding the mono audio signal and encoding the source radiation pattern to determine radiation pattern metadata. The encoding of the radiation pattern may involve determining a spherical harmonic transform of the representation of the radiation pattern and compressing the spherical harmonic transform to obtain encoded radiation pattern metadata.

Some such methods may involve encoding a plurality of directional audio objects based on a cluster of audio objects. The radiation pattern may be representative of a centroid that reflects an average sound level value for each frequency band. In some such implementations, the plurality of directional audio objects is encoded as a single directional audio object whose directivity corresponds with the time-varying energy-weighted average of each audio object's spherical harmonic coefficients. The encoded radiation pattern metadata may indicate a position of a cluster of audio objects that is an average of the position of each audio object.

Some methods may involve encoding group metadata regarding a radiation pattern of a group of directional audio objects. In some examples, the source radiation pattern may be rescaled to an amplitude of the input radiation pattern in a direction on a per-frequency basis to determine a normalized radiation pattern. According to some implementations, compressing the spherical harmonic transform may involve a Singular Value Decomposition method, principal component analysis, discrete cosine transforms, data-independent bases and/or eliminating spherical harmonic coefficients of the spherical harmonic transform that are above a threshold order of spherical harmonic coefficients.

Some alternative methods may involve decoding audio data. For example, some such methods may involve receiving an encoded core audio signal, encoded radiation pattern metadata and encoded audio object metadata, and decoding the encoded core audio signal to determine a core audio signal. Some such methods may involve decoding the encoded radiation pattern metadata to determine a decoded radiation pattern, decoding the audio object metadata and rendering the core audio signal based on the audio object metadata and the decoded radiation pattern.

In some instances, the audio object metadata may include at least one of time-varying 3 degree of freedom (3DoF) or 6 degree of freedom (6DoF) source orientation information. The core audio signal may include a plurality of directional objects based on a cluster of objects. The decoded radiation pattern may be representative of a centroid that reflects an average value for each frequency band. In some examples the rendering may be based on applying subband gains, based at least in part on the decoded radiation data, to the decoded core audio signal. The encoded radiation pattern metadata may correspond with a time- and frequency-varying set of spherical harmonic coefficients.

According to some implementations, the encoded radiation pattern metadata may include audio object type metadata. The audio object type metadata may, for example, indicate parametric directivity pattern data. The parametric directivity pattern data may include a cosine function, a sine function and/or a cardioidal function. In some examples, the audio object type metadata may indicate database directivity pattern data. Decoding the encoded radiation pattern metadata to determine the decoded radiation pattern may involve querying a directivity data structure that includes audio object types and corresponding directivity pattern data. In some examples, the audio object type metadata may indicate dynamic directivity pattern data. The dynamic directivity pattern data may correspond with a time- and frequency-varying set of spherical harmonic coefficients. Some methods may involve receiving the dynamic directivity pattern data prior to receiving the encoded core audio signal.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as those disclosed herein. The software may, for example, include instructions for performing one or more of the methods disclosed herein.

At least some aspects of the present disclosure may be implemented via apparatus. For example, one or more devices may be configured for performing, at least in part, the methods disclosed herein. In some implementations, an apparatus may include an interface system and a control system. The interface system may include one or more network interfaces, one or more interfaces between the control system and a memory system, one or more interfaces between the control system and another device and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

According to some such examples, the control system may be configured for receiving, via the interface system, audio data corresponding to at least one audio object. In some examples, the audio data may include a monophonic audio signal, audio object position metadata, audio object size metadata and a rendering parameter. Some such methods may involve determining whether the rendering parameter indicates a positional mode or a directivity mode and, upon determining that the rendering parameter indicates a directivity mode, rendering the audio data for reproduction via at least one loudspeaker according to a directivity pattern indicated by the positional metadata and/or the size metadata.

In some examples, rendering the audio data may involve interpreting the audio object position metadata as audio object orientation metadata. The audio object position metadata may, for example, include x, y, z coordinate data, spherical coordinate data and/or cylindrical coordinate data. In some instances, the audio object orientation metadata may include yaw, pitch and roll data.

According to some examples, rendering the audio data may involve interpreting the audio object size metadata as directivity metadata that corresponds to the directivity pattern. In some implementations, rendering the audio data may involve querying a data structure that includes a plurality of directivity patterns and mapping the positional metadata and/or the size metadata to one or more of the directivity patterns. In some instances the control system may be configured for receiving, via the interface system, the data structure. In some examples, the data structure may be received prior to the audio data. In some implementations, wherein the audio data may be received in a Dolby Atmos format. The audio object position metadata may, for example, correspond to world coordinates or model coordinates.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

BRIEF DESCRIPTION OF THE DRAWINGS

Like reference numbers and designations in the various drawings indicate like elements.

DETAILED DESCRIPTION

Figure 1A:
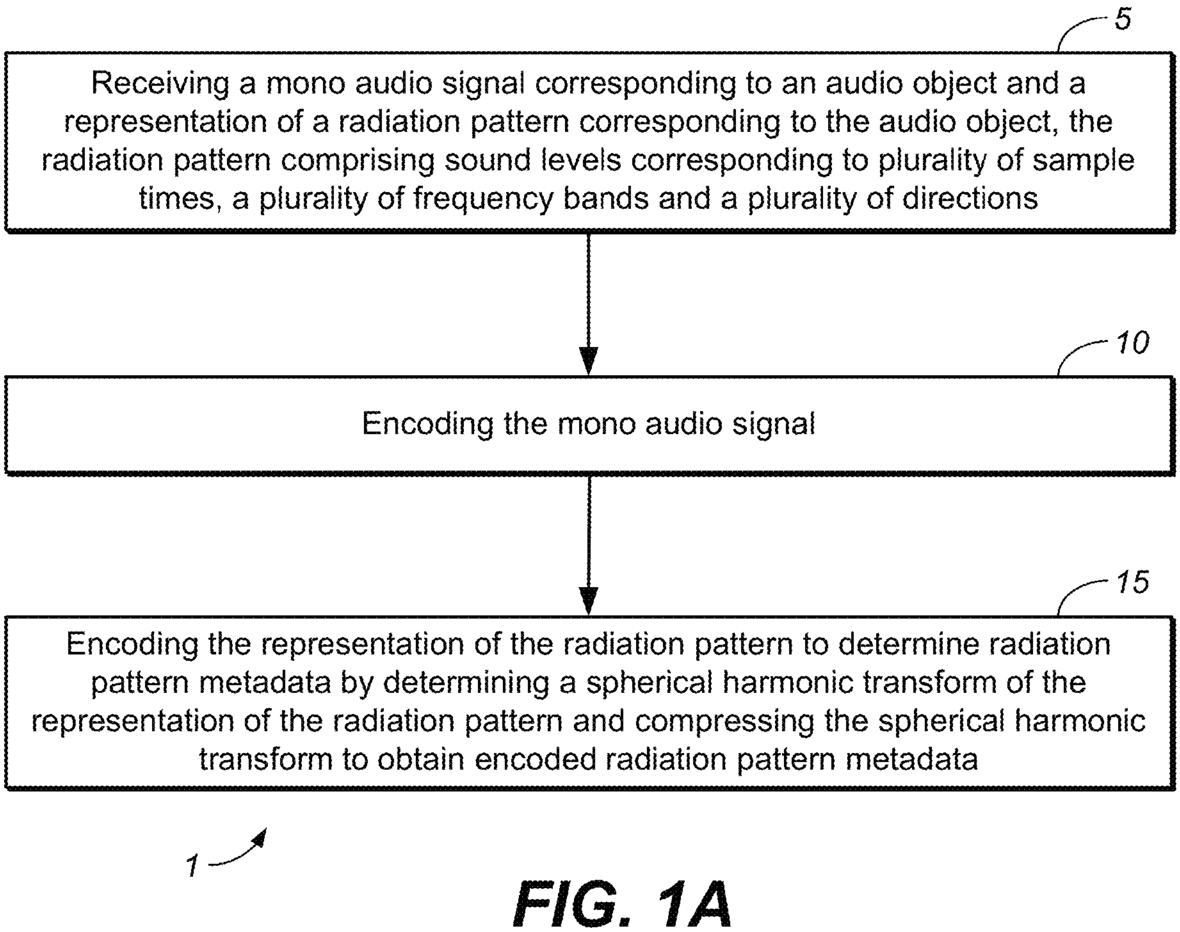
FIG. 1A is a flow diagram that shows blocks of an audio encoding method according to one example.

An aspect of the present disclosure relates to representation of, and efficient coding of, complex radiation patterns. Some such implementations, may include one or more of the following:

1. A representation of general sound radiation patterns as time and frequency dependent Nth order coefficients of a real-valued spherical harmonics (SPH) decomposition (N>=1). This representation can also be extended to be dependent on the level of the playback audio signal. Contrary to where the directional source signal is itself a HOA-like PCM representation, a mono object signal can be encoded separately from its directivity information, which is represented as a set of time-dependent scalar SPH coefficients in subbands.
2. An efficient encoding scheme to lower the bitrate required to represent this information
3. A solution to dynamically combine radiation patterns so that a scene made of several radiating sound sources can be represented by an equivalent reduced number of sources while retaining its perceptual quality at rendering time.

An aspect of the present disclosure relates to representing general radiation patterns, in order to complement the metadata for each mono audio object by a set of time/frequency-dependent coefficients representing the mono audio object's directivity projected in a spherical harmonics basis of order N (N>=1).

First order radiation patterns could be represented by a set of 4 scalar gain coefficients for a predefined set of frequency bands (e.g., ⅓$^{rd}$ octave). The set of frequency bands may also be known as a bin or sub-band. The bins or sub-bands may be determined based on a short-time Fourier transform (STFT) or a perceptual filterbank for a single frame of data (e.g., 512 samples as in Dolby Atmos). The resulting pattern can be rendered by evaluating the spherical harmonics decomposition at the required directions around the object.

In general, this radiation pattern is a characteristic of the source and may be constant over time. However, to represent a dynamic scene where objects rotate or change, or to ensure the data can be randomly accessed, it can be beneficial to update this set of coefficients at regular time-intervals. In the context of a dynamic auditory scene with moving objects, the result of object rotation can be directly encoded in the time-varying coefficients without requiring explicit separate encoding of object orientation.

Each type of sound source has a characteristic radiation/emission pattern, which typically differs with frequency band. For example, a violin may have a very different radiation pattern than a trumpet, a drum or a bell. Moreover, a sound source, such as a musical instrument, may radiate differently at pianissimo and fortissimo performance levels. As a result, the radiation pattern may also be a function of not only direction around the sounding object but also the pressure level of the audio signal it radiates, where the pressure level may also be time-varying.

Accordingly, instead of simply representing a sound field at a point in space, some implementations involve encoding audio data that corresponds to radiation patterns of audio objects so that they can be rendered from different vantage points. In some instances, the radiation patterns may be time- and frequency-varying radiation patterns. The audio data input to the encoding process may, in some instances, include a plurality of channels (e.g., 4, 6, 8, 20 or more channels) of audio data from directional microphones. Each channel may correspond to data from a microphone at a particular position in space around the sound source from which the radiation pattern can be derived. Assuming the relative direction from each microphone to the source is known, this can be achieved by numerical fitting of a set of spherical harmonic coefficients so that the resulting spherical function best matches the observed energy levels in different subbands of each input microphone signal. For instance, see the methods and by the systems described in connection with Application No. PCT/US2017/053946, Method, Systems and Apparatus for Determining Audio Representations, to Nicolas Tsingos and Pradeep Kumar Govindaraju, which is hereby incorporated by reference. In other examples, the radiation pattern of an audio object may be determined via numerical simulation.

Instead of simply encoding audio data from directional microphones at a sample level, some implementations involve encoding monophonic audio object signals with corresponding radiation pattern metadata that represents radiation patterns for at least some of the encoded audio objects. In some implementations, the radiation pattern metadata may be represented as spherical harmonic data. Some such implementations may involve a smoothing process and/or a compression/data reduction process.

FIG. 1A is a flow diagram that shows blocks of an audio encoding method according to one example. Method 1 may, for example, be implemented by a control system (such as the control system 815 that is described below with reference to FIG. 8) that includes one or more processors and one or more non-transitory memory devices. As with other disclosed methods, not all blocks of method 1 are necessarily performed in the order shown in FIG. 1A. Moreover, alternative methods may include more or fewer blocks.

In this example, block 5 involves receiving a mono audio signal corresponding to an audio object and also receiving a representation of a radiation pattern that corresponds to the audio object. According to this implementation, the radiation pattern includes sound levels corresponding to a plurality of sample times, a plurality of frequency bands and a plurality of directions. According to this example, block 10 involves encoding the mono audio signal.

In the example shown in FIG. 1A, block 15 involves encoding the source radiation pattern to determine radiation pattern metadata. According to this implementation, encoding the representation of the radiation pattern involves determining a spherical harmonic transform of the representation of the radiation pattern and compressing the spherical harmonic transform to obtain encoded radiation pattern metadata. In some implementations, the representation of the radiation pattern may be rescaled to an amplitude of the input radiation pattern in a direction on a per-frequency basis to determine a normalized radiation pattern.

In some instances, compressing the spherical harmonic transform may involve discarding some higher-order spherical harmonic coefficients. Some such examples may involve eliminating spherical harmonic coefficients of the spherical harmonic transform that are above a threshold order of spherical harmonic coefficients, e.g., above order 3, above order 4, above order 5, etc.

However, some implementations may involve alternative and/or additional compression methods. According to some such implementations, compressing the spherical harmonic transform may involve a Singular Value Decomposition method, principal component analysis, discrete cosine transforms, data-independent bases and/or other methods.

According to some examples, method 1 also may involve encoding a plurality of directional audio objects as a group or "cluster" of audio objects. Some implementations may involve encoding group metadata regarding a radiation pattern of a group of directional audio objects. In some instances, the plurality of directional audio objects may be encoded as a single directional audio object whose directivity corresponds with the time-varying energy-weighted average of each audio object's spherical harmonic coefficients. In some such examples, the encoded radiation pattern metadata may represent a centroid that corresponds with an average sound level value for each frequency band. For example, the encoded radiation pattern metadata (or related metadata) may indicate a position of a cluster of audio objects that is an average of the position of each directional audio objects in the cluster.

Figure 1B:
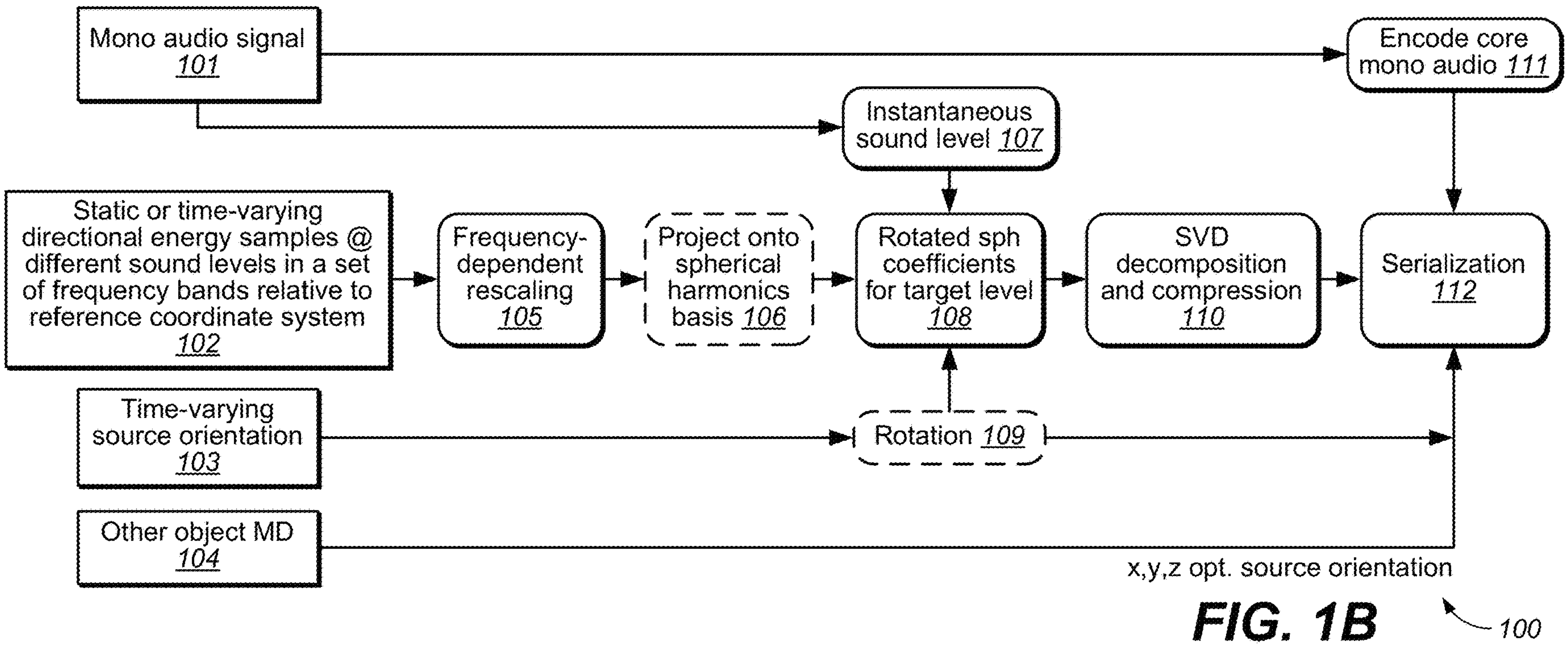
FIG. 1B illustrates blocks of a process that may be implemented by an encoding system for dynamically encoding per-frame directivity information for a directional audio object according to one example.

FIG. 1B illustrates blocks of a process that may be implemented by an encoding system 100 for dynamically encoding per-frame directivity information for a directional audio object according to one example. The process may, for example, be implemented via a control system such as the control system 815 that is described below with reference to FIG. 8. The encoding system 100 may receive a mono audio signal 101, which may correspond to a mono object signal as discussed above. The mono audio signal 101 may be encoded at block 111 and provided to a serialization block 112.

At block 102, static or time-varying directional energy samples at different sound levels in a set of frequency bands relative to a reference coordinate system may be processed. The reference coordinate system may be determined in a certain coordinate space such as model coordinate space or a world coordinate space.

At block 105, frequency-dependent rescaling of the time-varying directional energy samples from block 102 may be performed. In one example, the frequency-dependent rescaling may be performed in accordance with the example illustrated in FIGS. 2A-2C, as described below. The normalization may be based on a re-scaling of the amplitude e.g., for a high-frequency relative to a low-frequency direction.

The frequency-dependent re-scaling may be renormalized based on a core audio assumed capture direction. Such a core audio assumed capture direction may represent a listening direction relative to the sound source. For example, this listening direction could be called a look direction, where the look direction may be in a certain direction relative to a coordinate system (e.g., a forward direction or a backward direction).

At block 106, the re-scaled directivity output of 105 may be projected onto a spherical harmonics basis resulting in coefficients of the spherical harmonics.

At block 108, the spherical coefficients of block 106 are processed based on an instantaneous sound level 107 and/or information from rotation block 109. The instantaneous sound level 107 may be measured at a certain time in a certain direction. The information from rotation block 109 may indicate an (optional) rotation of time-varying source orientation 103. In one example, at block 109, the spherical coefficients can be adjusted to account for a time-dependent modification in source orientation relative to the originally recorded input data.

At block 108, a target level determination may be further performed based on an equalization that is determined relative to a direction of the assumed capture direction of the core audio signal. Block 108 may output a set of rotated spherical coefficients that have been equalized based on a target level determination.

At block 110, an encoding of the radiation pattern may be based on a projection onto a smaller subspace of spherical coefficients related to the source radiation pattern resulting in the encoded radiation pattern metadata. As shown in FIG. 1A, at block 110, an SVD decomposition and compression algorithm may be performed on the spherical coefficients output by block 108. In one example, the SVD decomposition and compression algorithm of block 110 may be performed in accordance with the principles described in connection with Equation Nos. 11-13, which are described below.

Alternatively, block 110 may involve utilizing other methods, such as Principal Component Analysis (PCA) and/or data-independent bases such as the 2D DCT to project a spherical harmonics representation $\breve{H}$ into a space that is conducive to lossy compression. The output of 110 may be a matrix T that represents a projection of data into a smaller subspace of the input, i.e., the encoded radiation pattern T. The encoded radiation pattern T, encoded core mono audio signal 111 and any other object metadata 104 (e.g., x, y, z, optional source orientation, etc.) may be serialized at serialization block 112 to output an encoded bitstream. In some examples, the radiation structure may be represented by the following bitstream syntax structure in each encoded audio frame:

Byte freqBandModePreset (e.g., wideband, octave, wideband, $\frac{1}{3}^{rd}$ octave, general).

This determines the number N and center frequency values of subbands)

Byte order (spherical harmonic order N)

Int*coefficients ((N+1)*(N+1)*K values)

Such syntax may encompass different sets of coefficients for different pressure/intensity levels of the sound source. Alternatively, if the directivity information is available at different signal levels, and if the level of the source cannot be further determined at playback time, a single set of coefficients may be dynamically generated. For example, such coefficients may be generated by interpolating between low-level coefficients and high-level coefficients based on the time-varying level of the object audio signal at encoding time.

The input radiation pattern relative to a mono audio object signal also may be 'normalized' to a given direction, such as the main response axis (which may be a direction from which it was recorded or an average of multiple recordings) and the encoded directivity and final rendering may need to be consistent with this "normalization". In one example this normalization may be specified as metadata. Generally, it is desirable to encode a core audio signal which would convey a good representation of the object timbre if no directivity information was applied.

Directivity Encoding

An aspect of the present disclosure is directed to implementing efficient encoding schemes for the directivity information, as the number of coefficients grows quadratically with the order of the decomposition. Efficient encoding schemes for directivity information may be implemented for final emission delivery of the auditory scene, for instance over a limited bandwidth network to an endpoint rendering device.

Assuming 16 bits are used to represent each coefficient, a 4th order spherical harmonic representation in ⅓rd octave bands would require 25*31~=12 kbit per frame. Refreshing this information at 30 Hz would require a transmission bitrate of at least 400 kbps, more than current object-based audio codecs are currently requiring for transmitting both audio and object metadata. In one example, a radiation pattern may be represented by:

$$G(\theta_i,\phi_i,\omega) \qquad \text{Equation No. (1)}$$

Figure 2A:
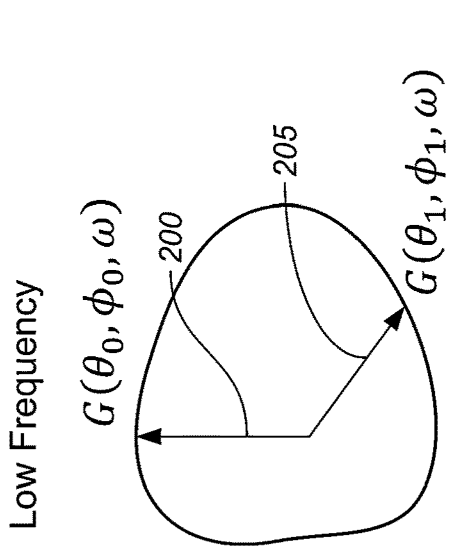
FIGS. 2A and 2B represent radiation patterns of an audio object in two different frequency bands.
Figure 2B:
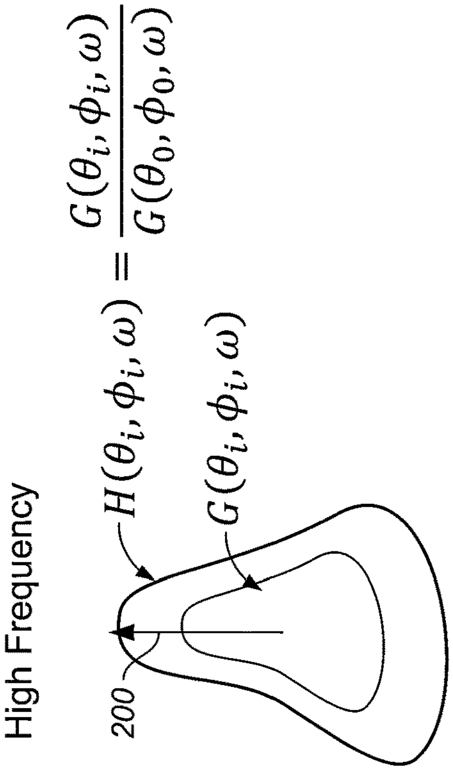

In Equation No. (1), $(\theta_i, \phi_i)$, $i\in\{1 \ldots P\}$ represent the discrete colatitude angle $\theta\in[0,\pi]$ and azimuth angle $\phi\in[0, 2\pi)$ relative to the acoustic source, P represents the total number of discrete angles and co represents spectral frequency. FIGS. 2A and 2B represent radiation patterns of an audio object in two different frequency bands. FIG. 2A may, for example, represent a radiation pattern of an audio object in a frequency band from 100 to 300 Hz, whereas FIG. 2B may, for example, represent a radiation pattern of the same audio object in a frequency band from 1 kHz to 2 kHz. Low frequencies tend to be relatively more omnidirectional, so the radiation pattern shown in FIG. 2A is relatively more circular than the radiation pattern shown in FIG. 2B. In FIG. 2A, $G(\theta_0, \phi_0, \omega)$ represents the radiation pattern in the direction of the main response axis 200, whereas $G(\theta_1, \phi_1, \omega)$ represents the radiation pattern in an arbitrary direction 205.

In some examples, the radiation pattern may be captured and determined by multiple microphones physically placed around the sound source corresponding to an audio object, whereas in other examples the radiation pattern may be determined via numerical simulation. In the example of multiple microphones, the radiation pattern may be time-varying reflecting, for example, a live recording. The radiation patterns may be captured at a variety of frequencies, including low (e.g., <100 Hz) medium (100 Hz< and >1 kHz) and high frequencies (>10 KHz). The radiation pattern may also be known as a spatial representation.

In another example, the radiation pattern may reflect a normalization based on a captured radiation pattern at a certain frequency in a certain direction $G(\theta_i, \phi_i, \omega)$ such as for example:

$$H(\theta_i, \phi_i, \omega) = \frac{G(\theta_i, \phi_i, \omega)}{G(\theta_0, \phi_0, \omega)} \qquad \text{Equation No. (2)}$$

Figure 2C:
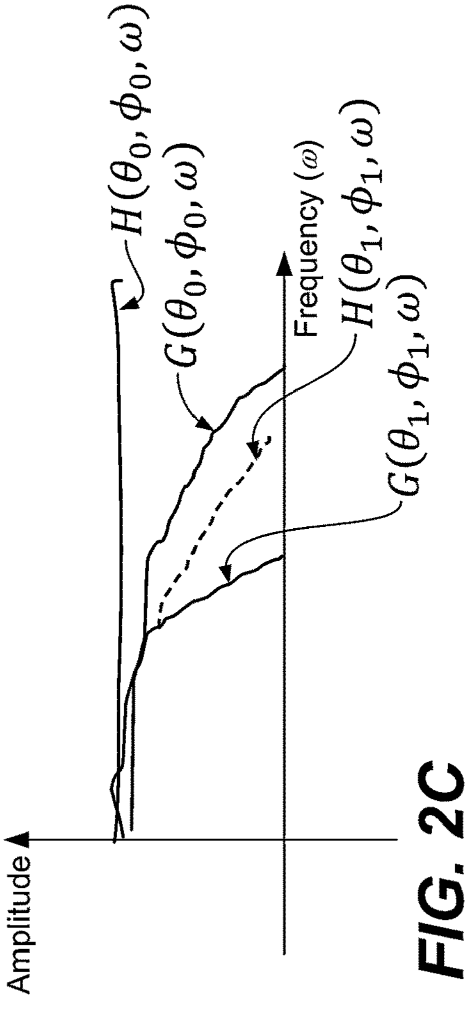
FIG. 2C is a graph that shows examples of normalized and non-normalized radiation patterns according to one example.

In Equation No. (2), $(\theta_0, \phi_0, \omega)$ represents the radiation pattern in the direction of the main response axis. Referring again to FIG. 2B, one can see the radiation pattern $G(\theta_i, \phi_i, \omega)$ and the normalized radiation pattern $H(\theta_i, \phi_i, \omega)$ in one example. FIG. 2C is a graph that shows examples of normalized and non-normalized radiation patterns according to one example. In this example, the normalized radiation pattern in the direction of the main response axis, which is represented as $H(\theta_0, \phi_0, \omega)$ in FIG. 2C, has substantially the same amplitude across the illustrated range of frequency bands. In this example, the normalized radiation pattern in the direction 205 (shown in FIG. 2A), which is represented as $H(\theta_1, \phi_1, \omega)$ in FIG. 2C, has relatively higher amplitudes in higher frequencies than the non-normalized radiation pattern, which is represented as $G(\theta_1, \phi_1, \omega)$ in FIG. 2C. For a given frequency band, the radiation pattern may be assumed to be constant for notational convenience but in practice it can vary over time, for example with different bowing techniques employed on a string instrument.

The radiation pattern, or a parametric representation thereof, may be transmitted. Pre-processing of the radiation pattern may be performed prior to its transmission. In one example, the radiation pattern or parametric representation may be pre-processed by a computing algorithm, examples of which are shown relative to FIG. 1A. After pre-processing, the radiation pattern may be decomposed on an orthogonal spherical basis based on, for example, the following:

$$H(\theta_i, \phi_i, \omega) \Leftrightarrow \breve{H}_n^m(\omega), \qquad \text{Equation No. (3)}$$

In Equation No. (3), $H(\theta_i, \phi_i, \omega)$ represents the spatial representation and $\breve{H}_n^m(\omega)$ represents a spherical harmonics representation that has fewer elements than the spatial representation. The conversion between $H(\theta_i, \phi_i, \omega)$ and $\breve{H}_n^m(\omega)$ may be based on using, for example, the real fully-normalized spherical harmonics:

$$Y_n^m(\theta, \phi) = \sqrt{\frac{(2n+1)}{4\pi} \frac{(n-m)!}{(n+m)!}} P_n^m(\cos\theta) e_m(\phi) \qquad \text{Equation No. (4)}$$

In Equation No. (4), $P_n^m(x)$ represent the Associated Legendre Polynomials, order $m \in \{-N \ldots N\}$, degree $n \in \{0 \ldots N\}$, and $$e_m(\phi) = \begin{cases} (-1)^m \sqrt{2}\cos(m\phi) & m > 0 \\ 1 & m = 0 \\ -\sqrt{2}\sin(m\phi) & m < 0 \end{cases} \qquad \text{Equation No. (5)}$$

Other spherical bases may also be used. Any approach for performing a spherical harmonics transform on discrete data may be used. In one example, a least squares approach may be used by first defining a transform matrix $Y \in \mathbb{R}^{P \times (N+1)^2}$:

$$Y = \begin{bmatrix} Y_0^0(\theta_1, \phi_1) & Y_1^{-1}(\theta_1, \phi_1) & Y_1^0(\theta_1, \phi_1) & \ldots & Y_N^N(\theta_1, \phi_1) \\ Y_0^0(\theta_2, \phi_2) & \ddots & \ddots & \ddots & Y_N^N(\theta_2, \phi_2) \\ \vdots & \ddots & \ddots & \ddots & \vdots \\ Y_0^0(\theta_P, \phi_P) & Y_1^{-1}(\theta_P, \phi_P) & Y_1^0(\theta_P, \phi_P) & \ldots & Y_N^N(\theta_P, \phi_P) \end{bmatrix}, \qquad \text{Equation No. (6)}$$

thereby relating the spherical harmonics representation to the spatial representation as $$\breve{H}(\omega) = Y^\dagger H(\omega), \qquad \text{Equation No. (7)}$$

In Equation No. (7), $H(\omega) = [H(\theta_1, \phi_1, \omega) \ldots H(\theta_P, \phi_P, \omega)]^T \in \mathbb{C}^{P \times 1}$. The spherical harmonic representations and/or the spatial representations may be stored for further processing.

The pseudo-inverse $Y^\dagger$ may be a weighted least-squares solution of the form:

$$\breve{H}(\omega) = (Y^T W Y)^{-1} Y^T W H(\omega). \qquad \text{Equation No. (8)}$$

Regularized solutions may also be applicable for cases where the distribution of spherical samples contains large amounts of missing data. The missing data may correspond to areas or directions for which there are no directivity samples available (for example, due to uneven microphone coverage). In many cases the distribution of spatial samples is sufficiently uniform that an identity weighting matrix W yields acceptable results. It can also often be assumed that $P \gg (N+1)^2$ so the spherical harmonics representation $\breve{H}(\omega)$ contains fewer elements than the spatial representation $H(\omega)$, thereby yielding a first stage of lossy compression that smoothes the radiation pattern data.

Now consider discrete frequencies bands $\omega_k$, $k \in \{1 \ldots K\}$. Matrix $H(\omega)$ can be stacked so that each frequency band is represented by a column of matrix $$H = [H(\omega_1) \ldots H(\omega_K)] \in \mathbb{C}^{P=K}. \qquad \text{Equation No. (9)}$$

That is, the spatial representation $H(\omega)$ may be determined based on frequency bins/bands/sets. Consequently the spherical harmonic representation may be based on:

$$\breve{H} = Y^\dagger H \in \mathbb{C}^{(N+1)^2 \times K} \qquad \text{Equation No. (10)}$$

In Equation No. (10), $\breve{H}$ represents the radiation pattern for all discrete frequencies in the spherical harmonics domain. It is anticipated that neighboring columns of $\breve{H}$ are highly correlated, leading to redundancy in the representation. Some implementations involve further decomposing $\breve{H}$ by matrix factorization in the form of $$\breve{H}^T = U \Sigma V^*. \qquad \text{Equation No. (11)}$$

Some embodiments may involve performing Singular Value Decomposition (SVD), where $U \in \mathbb{C}^{K \times K}$ and $V \in \mathbb{C}^{(N+1)^2 \times (N+1)^2}$ represent left and right singular matrices and $\Sigma \in \mathbb{C}^{K \times (N+1)^2}$ represents a matrix of decreasing singular values along its diagonal. The matrix V information may be received or stored. Alternatively, Principal Component Analysis (PCA) and data-independent bases such as the 2D DCT may be used to project $\check{H}$ into a space that is conducive to lossy compression.

Let $O=(N+1)^2$. In some examples, in order to achieve compression, an encoder may discard components corresponding to smaller singular values by calculating the product based on the following:

$$T=U\Sigma', \qquad \text{Equation No. (12)}$$

In Equation No. (12), $\Sigma' \in \mathbb{C}^{K \times O'}$ represents a truncated copy of Σ. The matrix T may represent a projection of data into a smaller subspace of the input. T represents encoded radiation pattern data that is then transmitted for further processing. On the decoding, receiving side, in some examples the matrix T may be received and a low-rank approximation to $\check{H}^T$ may be reconstructed based on:

$$\check{\tilde{H}}^T=TV'^*=U\Sigma'V'^* \qquad \text{Equation No. (13)}$$

In Equation No. (13), $V' \in \mathbb{C}^{O' \times O}$ represents a truncated copy of V. The matrix V may either be transmitted or stored on the decoder side.

Following are three examples for transmitting the truncated decomposition and truncated right singular vectors:

1. The transmitter may transmit encoded radiation T and truncated right singular vectors V' for each object independently.
2. Objects may be grouped, for example per a similarity measure, and U and V may be calculated as representative bases for multiple objects. The encoded radiation T may therefore be transmitted per-object and U and V may be transmitted per group of objects.
3. Left and right singular matrices U and V may be pre-calculated on a large database of representative data (e.g., training data) and information regarding V may be stored on the side of the receiver. In some such examples, only the encoded radiation T may be transmitted per object. The DCT is another example of a basis that may be stored on the side of the receiver.

Spatial Coding of Directional Objects

When complex auditory scenes comprising multiple objects are encoded and transmitted, it is possible to apply spatial coding techniques where individual objects are replaced by a smaller number of representative clusters in a way that best preserve the auditory perception of the scene. In general, replacing a group of sound sources by a representative "centroid" requires computing an aggregate/average value for each metadata field. For instance, the position of a cluster of sound sources can be the average of the position of each source. By representing the radiation pattern of each source using a spherical harmonics decomposition as outlined above (e.g., with reference to Eq. Nos. 1-12), it is possible to linearly combine the set of coefficients in each subband for each source in order to construct an average radiation pattern for a cluster of sources. By computing a loudness or energy-weighted average of the spherical harmonics coefficients over time, it is possible to construct a time-varying perceptually optimized representation that better preserves the original scene.

Figure 1C:
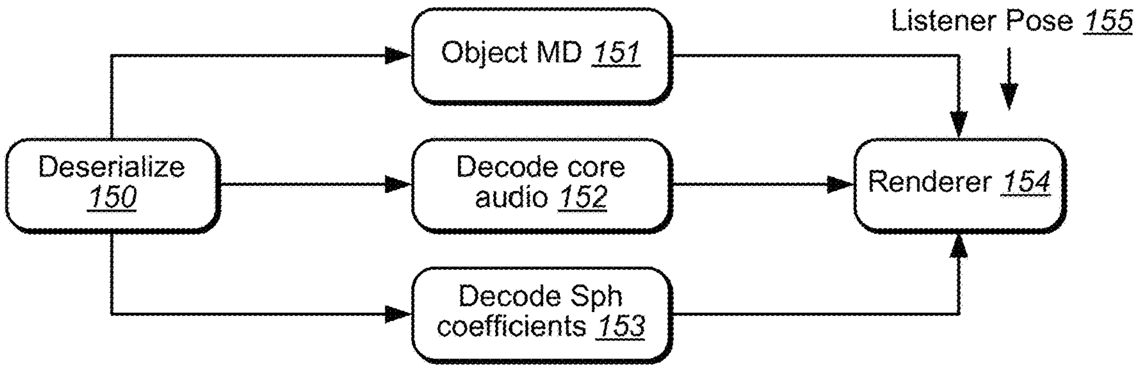
FIG. 1C illustrates blocks of a process that may be implemented by a decoding system according to one example.

FIG. 1C illustrates blocks of a process that may be implemented by a decoding system according to one example. The blocks shown in FIG. 1C may, for example, be implemented by a control system of a decoding device (such as the control system 815 that is described below with reference to FIG. 8) that includes one or more processors and one or more non-transitory memory devices. At block 150, metadata and encoded core mono audio signal may be received and deserialized. The deserialized information may include object metadata 151, an encoded core audio signal, and encoded spherical coefficients. At block 152, the encoded core audio signal may be decoded. At block 153, the encoded spherical coefficients may be decoded. The encoded radiation pattern information may include the encoded radiation pattern T and/or the matrix V. The matrix V would depend on the method used to project $\check{H}$ into a space. If, at block 110 of FIG. 1B, an SVD algorithm is used, then the matrix V may be received or stored by the decoding system.

The object metadata 151 may include information regarding a source to listener relative direction. In one example, the metadata 151 may include information regarding a listener's distance and direction and one or more objects distance and direction relative to a 6DoF space. For example, the metadata 151 may include information regarding the source's relative rotation, distance and direction in a 6DoF space. In the example of multiple objects in clusters, the metadata field may reflect information regarding a representative "centroid" that reflects an aggregate/average value of a cluster of objects.

A renderer 154 may then render the decoded core audio signal and the decoded spherical harmonics coefficients. In one example, the renderer 154 may render the decoded core audio signal and the decoded spherical harmonics coefficients based on object metadata 151. The renderer 154 may determine sub-band gains for the spherical coefficients of a radiation pattern based on information from the metadata 151, e.g., source-to-listener relative directions. The renderer 154 may then render a core audio object signals based on the determined subband gains of the corresponding decoded radiation pattern(s), source and/or listener pose information (e.g., x, y, z, yaw, pitch, roll) 155. The listener pose information may correspond to a user's location and viewing direction in 6DoF space. The listener pose information may be received from a source local to a VR playback system, such as, e.g., an optical tracking apparatus. The source pose information corresponds to the sounding object's position and orientation in space. It can also be inferred from a local tracking system, e.g., if the user's hands are tracked and interactively manipulating the virtual sounding object or if a tracked physical prop/proxy object is used.

Figure 3:
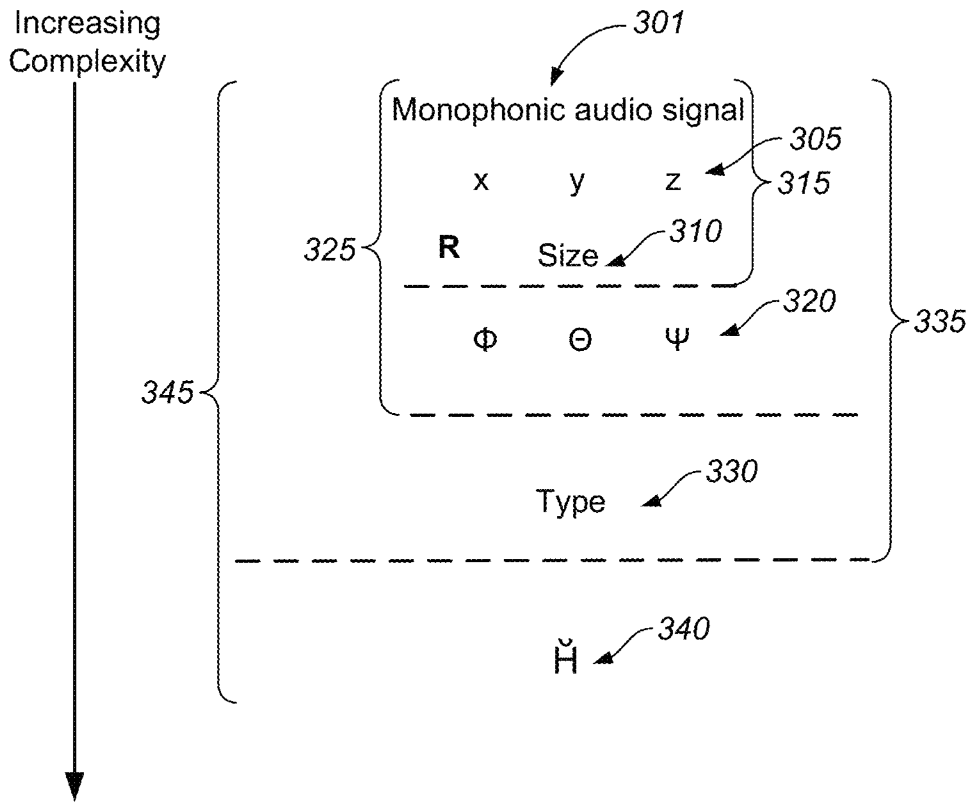
FIG. 3 shows an example of a hierarchy that includes audio data and various types of metadata.

FIG. 3 shows an example of a hierarchy that includes audio data and various types of metadata. As with other drawings provided herein, the numbers and types of audio data and metadata shown in FIG. 3 are merely provided by way of example. Some encoders may provide the complete set of audio data and metadata shown in FIG. 3 (data set 345), whereas other encoders may provide only a portion of the metadata shown in FIG. 3, e.g., only the data set 315, only the data set 325 or only the data set 335.

In this example, the audio data includes the monophonic audio signal 301. The monophonic audio signal 301 is one example of what may sometimes be referred to herein as a "core audio signal." However, in some examples a core audio signal may include audio signals corresponding to a plurality of audio objects that are included in a cluster.

In this example, the audio object position metadata 305 is expressed as Cartesian coordinates. However, in alternative examples, audio object position metadata 305 may be expressed via other types of coordinates, such as spherical or polar coordinates. Accordingly, the audio object position metadata 305 may include three degree of freedom (3 DoF) position information. According to this example, the audio object metadata includes audio object size metadata 310. In alternative examples, the audio object metadata may include one or more other types of audio object metadata.

In this implementation, the data set 315 includes the monophonic audio signal 301, the audio object position metadata 305 and the audio object size metadata 310. Data set 315 may, for example, be provided in a Dolby Atmos™ audio data format.

In this example, the data set 315 also includes the optional rendering parameter R. According to some disclosed implementations, the optional rendering parameter R may indicate whether at least some of the audio object metadata of data set 315 should be interpreted in its "normal" sense (e.g., as position or size metadata) or as directivity metadata. In some disclosed implementations, the "normal" mode may be referred to herein as a "positional mode" and the alternative mode may be referred to herein as a "directivity mode." Some examples are described below with reference to FIGS. 5A-6.

According to this example, the orientation metadata 320 includes angular information for expressing the yaw, pitch and roll of an audio object. In this example, the orientation metadata 320 indicate the yaw, pitch and roll as $\phi$, $\theta$ and $\Psi$. The data set 325 includes sufficient information to orient an audio object for six degrees of freedom (6 DoF) applications.

In this example, the data set 335 includes audio object type metadata 330. In some implementations, the audio object type metadata 330 may be used to indicate corresponding radiation pattern metadata. Encoded radiation pattern metadata may be used (e.g., by a decoder or a device that receives audio data from the decoder) to determine a decoded radiation pattern. In some examples, the audio object type metadata 330 may indicate, in essence, "I am a trumpet," "I am a violin," etc. In some examples, a decoding device may have access to a database of audio object types and corresponding directivity patterns. According to some examples, the database may be provided along with encoded audio data, or prior to the transmission of audio data. Such audio object type metadata 330 may be referred to herein as "database directivity pattern data."

According to some examples, the audio object type metadata may indicate parametric directivity pattern data. In some examples, the audio object type metadata 330 may indicate a directivity pattern corresponding with a cosine function of specified power, may indicate a cardioidal function, etc.

In some examples, the audio object type metadata 330 may indicate that the radiation pattern corresponds with a set of spherical harmonic coefficients. For example, the audio object type metadata 330 may indicate that spherical harmonic coefficients 340 are being provided in the data set 345. In some such examples, the spherical harmonic coefficients 340 may be a time- and/or frequency-varying set of spherical harmonic coefficients, e.g., as described above. Such information could require the largest amount of data, as compared to the rest of the metadata hierarchy shown in FIG. 3. Therefore, in some such examples, the spherical harmonic coefficients 340 may be provided separately from the monophonic audio signal 301 and corresponding audio object metadata. For example, the spherical harmonic coefficients 340 may be provided at the beginning of a transmission of audio data, before real-time operations are initiated (e.g., real-time rendering operations for a game, a movie, a musical performance, etc.).

According to some implementations, a device on the decoder side, such as a device that provides the audio to a reproduction system, may determine the capabilities of the reproduction system and provide directivity information according to those capabilities. For example, even if the entire data set 345 is provided to a decoder, only a useable portion of the directivity information may be provided to a reproduction system in some such implementations. In some examples, a decoding device may determine which type(s) of directivity information to use according to the capabilities of the decoding device.

Figure 4:
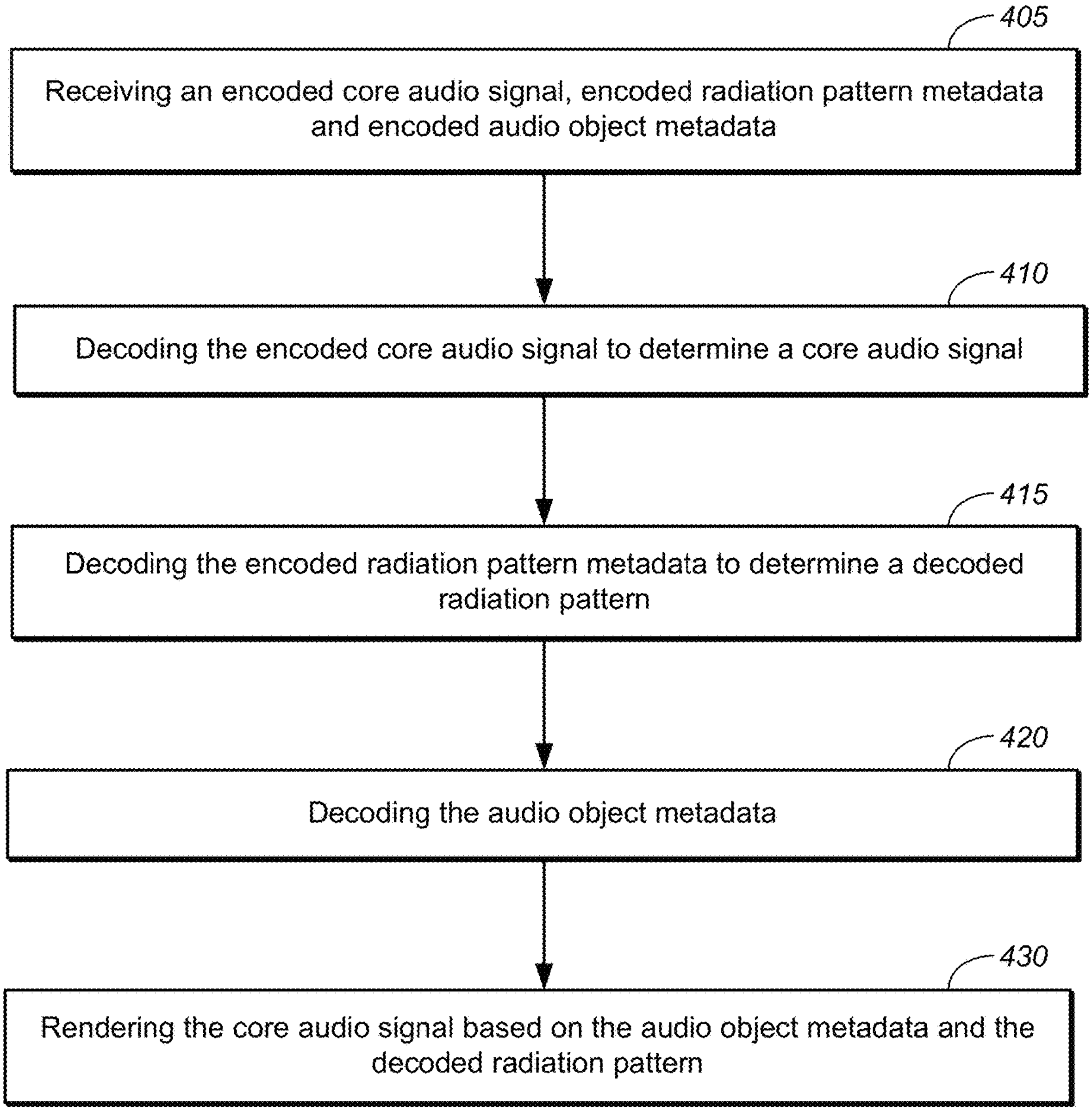
FIG. 4 is a flow diagram that shows blocks of an audio decoding method according to one example.

FIG. 4 is a flow diagram that shows blocks of an audio decoding method according to one example. Method 400 may, for example, be implemented by a control system of a decoding device (such as the control system 815 that is described below with reference to FIG. 8) that includes one or more processors and one or more non-transitory memory devices. As with other disclosed methods, not all blocks of method 400 are necessarily performed in the order shown in FIG. 4. Moreover, alternative methods may include more or fewer blocks.

In this example, block 405 involves receiving an encoded core audio signal, encoded radiation pattern metadata and encoded audio object metadata. The encoded radiation pattern metadata may include audio object type metadata. The encoded core audio signal may, for example, include a monophonic audio signal. In some examples, the audio object metadata may include of 3 DoF position information, 6 DoF position and source orientation information, audio object size metadata, etc. The audio object metadata may be time-varying in some instances.

In this example, block 410 involves decoding the encoded core audio signal to determine a core audio signal. Here, block 415 involves decoding the encoded radiation pattern metadata to determine a decoded radiation pattern. In this example, block 420 involves decoding at least some of the other encoded audio object metadata. Here, block 430 involves rendering the core audio signal based on the audio object metadata (e.g., the audio object position, orientation and/or size metadata) and the decoded radiation pattern.

Block 415 may involve various types of operations, depending on the particular implementation. In some instances, the audio object type metadata may indicate database directivity pattern data. Decoding the encoded radiation pattern metadata to determine the decoded radiation pattern may involve querying a directivity data structure that includes audio object types and corresponding directivity pattern data. In some examples, the audio object type metadata may indicate parametric directivity pattern data, such as directivity pattern data corresponding to a cosine function, a sine function or a cardioidal function.

According to some implementations, the audio object type metadata may indicate dynamic directivity pattern data, such as a time- and/or frequency-varying set of spherical harmonic coefficients. Some such implementations may involve receiving the dynamic directivity pattern data prior to receiving the encoded core audio signal.

In some instances a core audio signal received in block 405 may include audio signals corresponding to a plurality of audio objects that are included in a cluster. According to some such examples, the core audio signal may be based on a cluster of audio objects that may include a plurality of directional audio objects. The decoded radiation pattern determined in block 415 may correspond with a centroid of the cluster and may represent an average value for each frequency band of each of the plurality of directional audio objects. The rendering process of block 430 may involve applying subband gains, based at least in part on the decoded radiation data, to the decoded core audio signal. In some examples, after decoding and applying directivity processing to the core audio signal, the signal may be further virtualized to its intended location relative to a listener position using audio object position metadata and known rendering processes, such as binaural rendering over headphones, rendering using loudspeakers of a reproduction environment, etc.

As discussed above with reference to FIG. 3, in some implementations audio data may be accompanied by a rendering parameter (shown as R in FIG. 3). The rendering parameter may indicate whether at least some audio object metadata, such as Dolby Atmos metadata, should be interpreted in a normal manner (e.g., as position or size metadata) or as directivity metadata. The normal mode may be referred to as a "positional mode" and the alternative mode may be referred to herein as a "directivity mode." Accordingly, in some examples the rendering parameter may indicate whether to interpret at least some audio object metadata as directional relative to a speaker or positional relative to a room or other reproduction environment. Such implementations may be particularly useful for directivity rendering using smart speakers with multiple drivers, e.g., as described below.

Figure 5A:
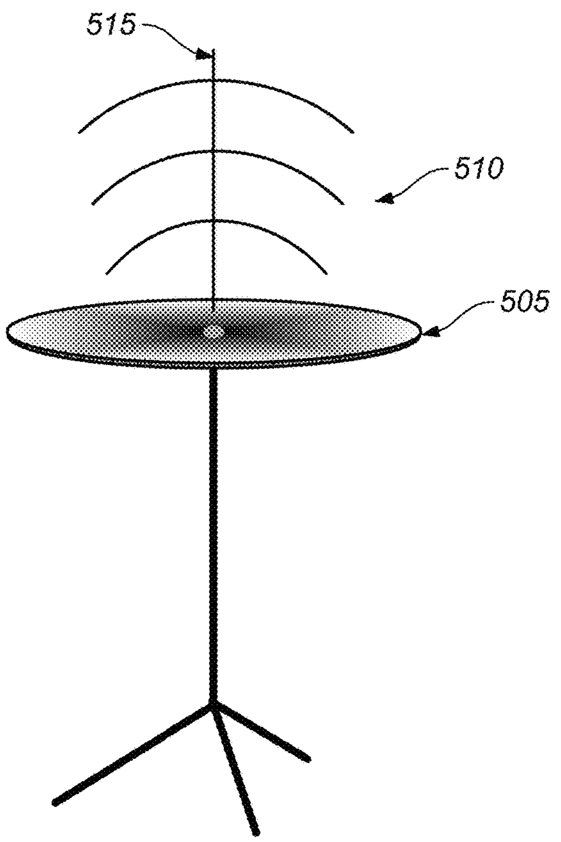
FIG. 5A depicts a drum cymbal.

FIG. 5A depicts a drum cymbal. In this example, the drum cymbal 505 is shown emitting sound having a directivity pattern 510 that has a substantially vertical main response axis 515. The directivity pattern 510 itself is also primarily vertical, with some degree of spreading from the main response axis 515.

Figure 5B:
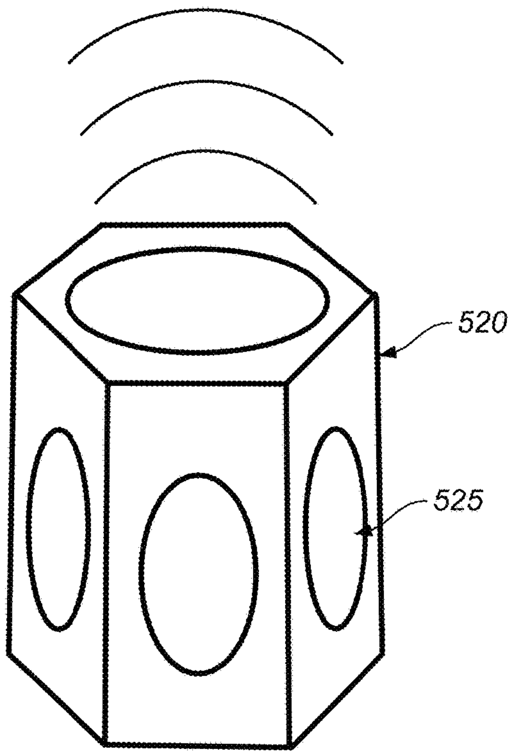
FIG. 5B shows an example of a speaker system.

FIG. 5B shows an example of a speaker system. In this example, the speaker system 525 includes multiple speakers/transducers configured for emitting sound in various directions, including upwards. The topmost speaker could, in some instances, be used in a conventional Dolby Atmos manner (a "positional mode") to render position, e.g., to cause sound to be reflected from the ceiling to simulate height/ceiling speakers (z=1). In some such instances, the corresponding Dolby Atmos rendering may include additional height virtualization processing that enhances the perception of the audio object having a particular position.

In other use cases, the same upward-firing speaker(s) could be operated in a "directivity mode," e.g., to simulate a directivity pattern of, e.g., a drum, symbols, or another audio object having a directivity pattern similar to the directivity pattern 510 shown in FIG. 5A. Some speaker systems 525 may be capable of beamforming, which could aid in the construction of a desired directivity pattern. In some examples, no virtualization processing would be involved, in order to diminish the perception of the audio object having a particular position.

Figure 6:
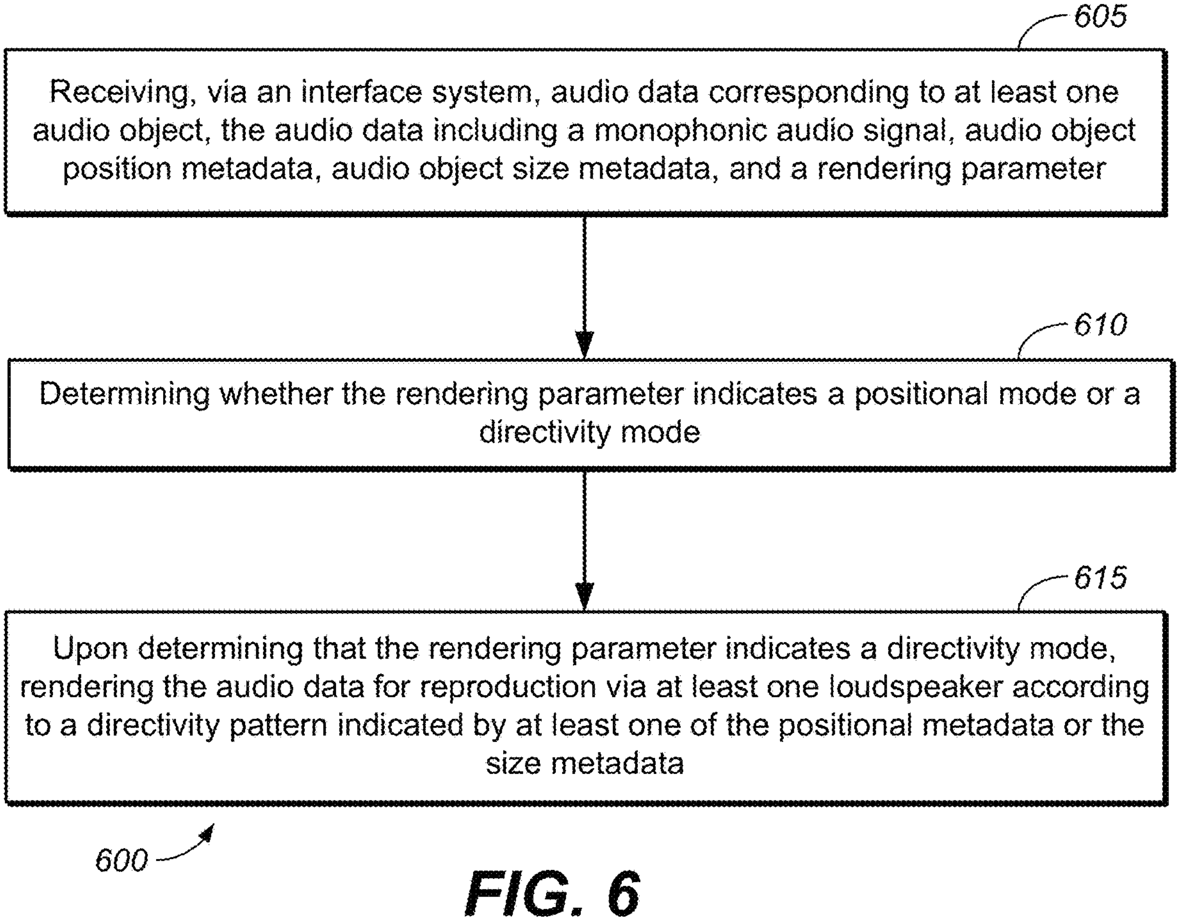
FIG. 6 is a flow diagram that shows blocks of an audio decoding method according to one example.

FIG. 6 is a flow diagram that shows blocks of an audio decoding method according to one example. Method 600 may, for example, be implemented by a control system of a decoding device (such as the control system 815 that is described below with reference to FIG. 8) that includes one or more processors and one or more non-transitory memory devices. As with other disclosed methods, not all blocks of method 600 are necessarily performed in the order shown in FIG. 6. Moreover, alternative methods may include more or fewer blocks.

In this example, block 605 involves receiving audio data corresponding to at least one audio object, the audio data including a monophonic audio signal, audio object position metadata, audio object size metadata, and a rendering parameter. In this implementation, block 605 involves receiving these data via an interface system of a decoding device (such as the interface system 810 of FIG. 8). In some instances, the audio data may be received in Dolby Atmos™ format. The audio object position metadata may correspond to world coordinates or model coordinates, depending on the particular implementation.

In this example, block 610 involves determining whether the rendering parameter indicates a positional mode or a directivity mode. In the example shown in FIG. 6, if it is determined that the rendering parameter indicates a directivity mode, in block 615 the audio data are rendered for reproduction (e.g., via at least one loudspeaker, via headphones, etc.) according to a directivity pattern indicated by at least one of the positional metadata or the size metadata. For example, the directivity pattern may be similar to that shown in FIG. 5A.

In some examples, rendering the audio data may involve interpreting the audio object position metadata as audio object orientation metadata. The audio object position metadata may be Cartesian/x, y, z coordinate data, spherical coordinate data or cylindrical coordinate data. The audio object orientation metadata may be yaw, pitch and roll metadata.

According to some implementations, rendering the audio data may involve interpreting the audio object size metadata as directivity metadata that corresponds to a directivity pattern. In some such examples, rendering the audio data may involve querying a data structure that includes a plurality of directivity patterns and mapping at least one of the positional metadata or the size metadata to one or more of the directivity patterns. Some such implementations may involve receiving, via the interface system, the data structure. According to some such implementations, the data structure may be received prior to the audio data.

Figure 7:
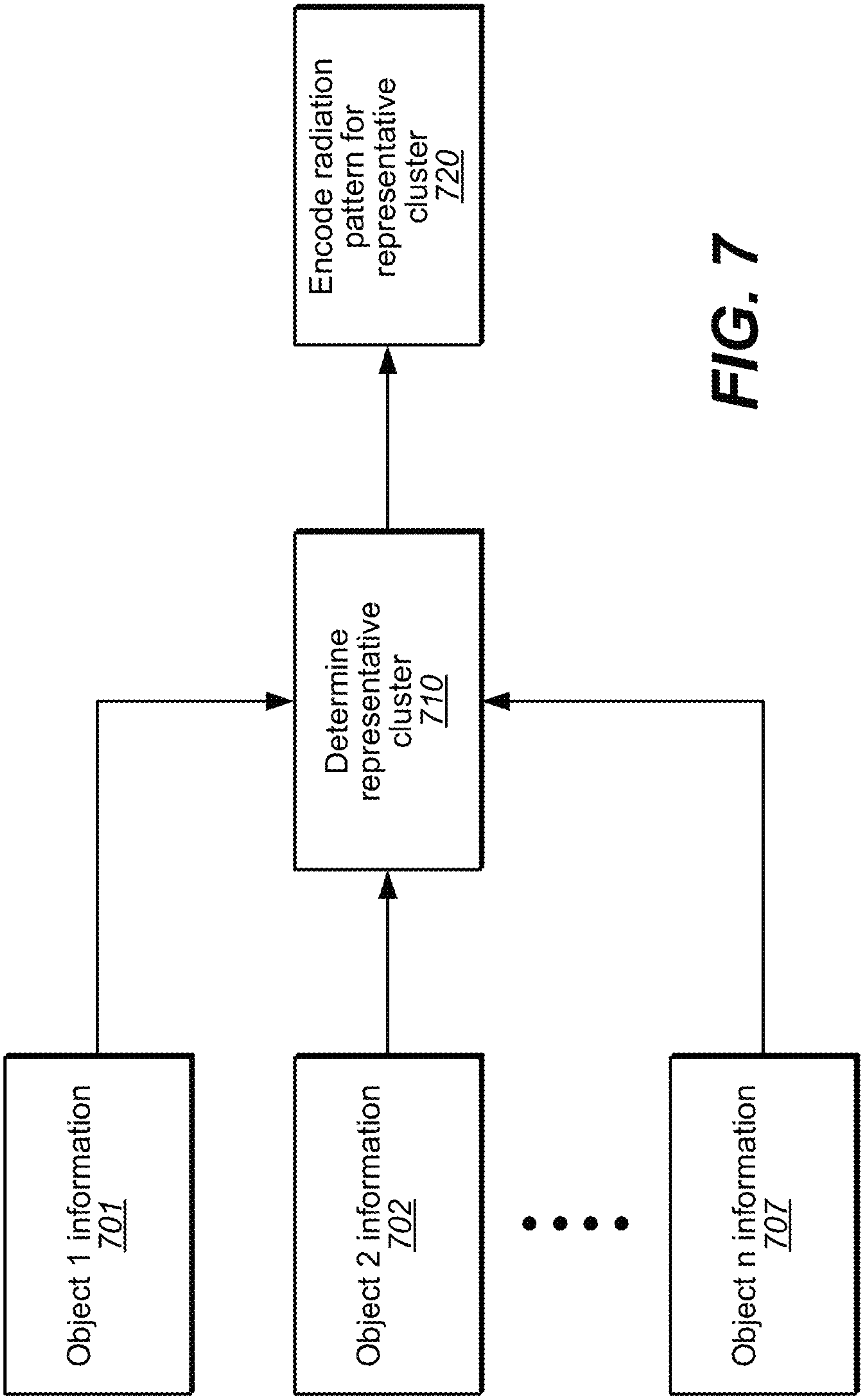
FIG. 7 illustrates one example of encoding multiple audio objects.

FIG. 7 illustrates one example of encoding multiple audio objects. In one example, object 1-*n* information 701, 702, 703, etc. may be encoded. In one example, a representative cluster for audio objects 701-703 may be determined at block 710. In one example, the group of sound sources may be aggregated and represented by a representative "centroid" that involves computing an aggregate/average value for the metadata field. For example, the position of a cluster of sound sources can be the average of the position of each source. At block 720, the radiation pattern for the representative cluster can be encoded. In some examples, the radiation pattern for the cluster may be encoded in accordance with principles described above with reference to FIG. 1A or FIG. 1B.

Figure 8:
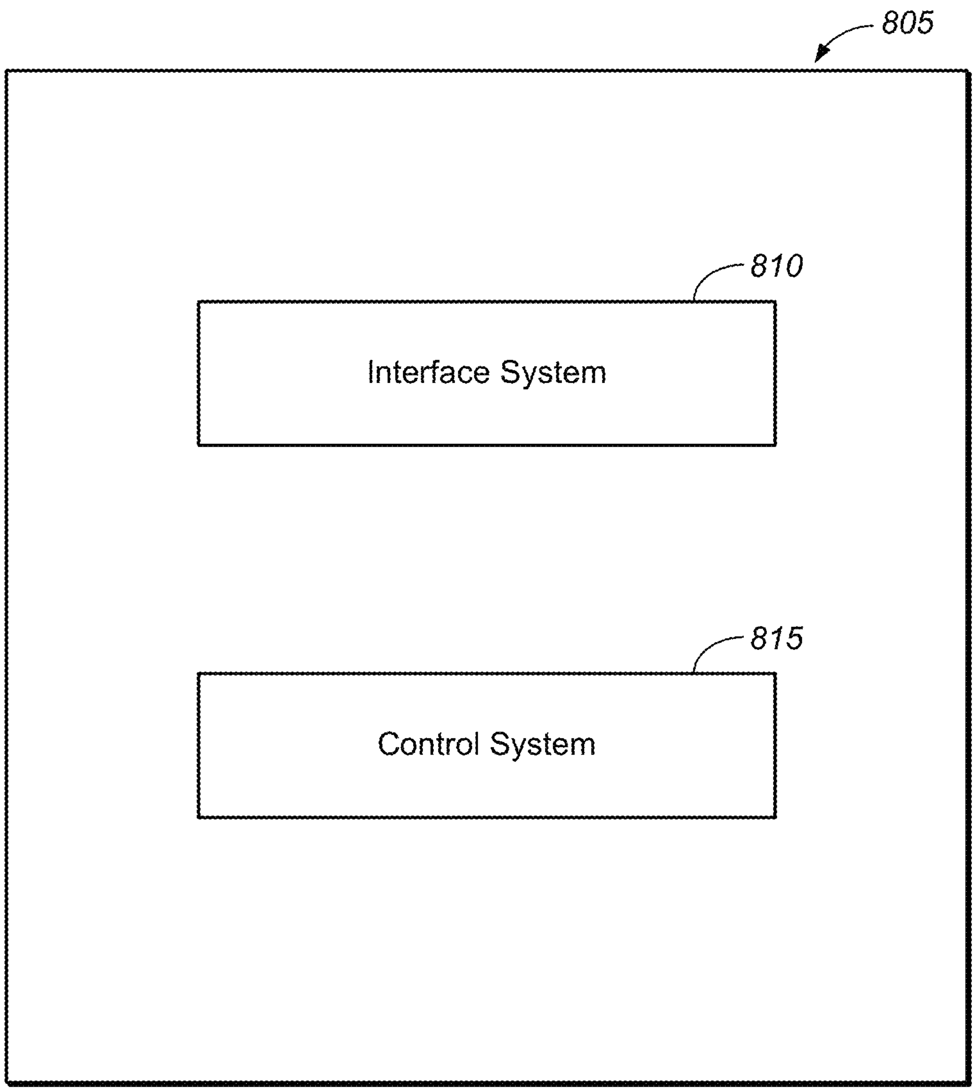
FIG. 8 is a block diagram that shows examples of components of an apparatus that may be configured to perform at least some of the methods disclosed herein.

FIG. 8 is a block diagram that shows examples of components of an apparatus that may be configured to perform at least some of the methods disclosed herein. For example, the apparatus 805 may be configured to perform one or more of the methods described above with reference to FIGS. 1A-1C, 4, 6 and/or 7. In some examples, the apparatus 805 may be, or may include, a personal computer, a desktop computer or other local device that is configured to provide audio processing. In some examples, the apparatus 805 may be, or may include, a server. According to some examples, the apparatus 805 may be a client device that is configured for communication with a server, via a network interface. The components of the apparatus 805 may be implemented via hardware, via software stored on non-transitory media, via firmware and/or by combinations thereof. The types and numbers of components shown in FIG. 8, as well as other figures disclosed herein, are merely shown by way of example. Alternative implementations may include more, fewer and/or different components.

In this example, the apparatus 805 includes an interface system 810 and a control system 815. The interface system 810 may include one or more network interfaces, one or more interfaces between the control system 815 and a memory system and/or one or more external device interfaces (such as one or more universal serial bus (USB) interfaces). In some implementations, the interface system 810 may include a user interface system. The user interface system may be configured for receiving input from a user. In some implementations, the user interface system may be configured for providing feedback to a user. For example, the user interface system may include one or more displays with corresponding touch and/or gesture detection systems. In some examples, the user interface system may include one or more microphones and/or speakers. According to some examples, the user interface system may include apparatus for providing haptic feedback, such as a motor, a vibrator, etc. The control system 815 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some examples, the apparatus 805 may be implemented in a single device. However, in some implementations, the apparatus 805 may be implemented in more than one device. In some such implementations, functionality of the control system 815 may be included in more than one device. In some examples, the apparatus 805 may be a component of another device.

Various example embodiments of the present disclosure may be implemented in hardware or special purpose circuits, software, logic or any combination thereof. Some aspects may be implemented in hardware, while other aspects may be implemented in firmware or software, which may be executed by a controller, microprocessor or other computing device. In general, the present disclosure is understood to also encompass an apparatus suitable for performing the methods described above, for example an apparatus (spatial renderer) having a memory and a processor coupled to the memory, wherein the processor is configured to execute instructions and to perform methods according to embodiments of the disclosure.

While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller, or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product comprising a computer program tangibly embodied on a machine-readable medium, in which the computer program containing program codes configured to carry out the methods as described above.

In the context of the disclosure, a machine-readable medium may be any tangible medium that may contain, or store, a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention, or of what may be claimed, but rather as descriptions of features that may be specific to particular embodiments of particular inventions. Certain features that are described in this specification in the context of separate embodiments may also may be implemented in combination in a single embodiment. Conversely, various features that are described in the context of a single embodiment may also may be implemented in multiple embodiments separately or in any suitable sub-combination.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for decoding audio data, comprising:

receiving an encoded core audio signal, encoded radiation pattern metadata and encoded audio object metadata, wherein the audio object metadata includes 6DoF source orientation information;

decoding the encoded core audio signal to determine a core audio signal;

decoding the encoded radiation pattern metadata to determine a decoded radiation pattern;

decoding the audio object metadata; and rendering the core audio signal based on the audio object metadata and the decoded radiation pattern.

2. The method of claim 1, wherein the core audio signal comprises a plurality of directional objects based on a cluster of objects, and wherein the decoded radiation pattern is representative of a centroid that reflects an average value for each frequency band.

3. The method of claim 1, wherein the encoded radiation pattern metadata corresponds with a time- and frequency-varying set of spherical harmonic coefficients.

4. The method of claim 1, wherein the encoded radiation pattern metadata comprises audio object type metadata.

5. The method of claim 4, wherein the audio object type metadata indicates parametric directivity pattern data and wherein the parametric directivity pattern data includes one or more functions selected from a list of functions that consists of a cosine function, a sine function or a cardioidal function.

6. The method of claim 4, wherein the audio object type metadata indicates dynamic directivity pattern data and wherein the dynamic directivity pattern data corresponds with a time- and frequency-varying set of spherical harmonic coefficients.

7. The method of claim 6, further comprising receiving the dynamic directivity pattern data prior to receiving the encoded core audio signal.

8. The method of claim 1, wherein the rendering is based on applying subband gains, based at least in part on the decoded radiation pattern, to the decoded core audio signal.

9. The method of claim 4 wherein the audio object type metadata indicates database directivity pattern data and wherein decoding the encoded radiation pattern metadata to determine the decoded radiation pattern comprises querying a directivity data structure that includes audio object types and corresponding directivity pattern data.

10. A non-transitory computer-readable medium having stored thereon instructions, that when executed by one or more processors, cause one or more processors to perform the method of 1.

11. An audio decoding apparatus, comprising:

an interface system; and a control system configured for:

receiving, via the interface system, audio data corresponding to at least one audio object, the audio data including a monophonic audio signal, audio object position metadata, audio object size metadata, and a rendering parameter, wherein the audio object position metadata includes 6DoF source orientation information;

determining whether the rendering parameter indicates a positional mode or a directivity mode; and, upon determining that the rendering parameter indicates a directivity mode, rendering the audio data for reproduction via at least one loudspeaker according to a directivity pattern indicated by at least one of the audio object position metadata or the audio object size metadata.

* * * * *